United States Patent [19]

Cope

[11] 4,360,172
[45] Nov. 23, 1982

[54] LINE WINDING DEVICE FOR FISHING REELS

[76] Inventor: James R. Cope, 10500 Cherokee La., Leawood, Kans. 66206

[21] Appl. No.: 221,545

[22] Filed: Dec. 31, 1980

[51] Int. Cl.³ .................... B65H 49/06; B65H 49/26
[52] U.S. Cl. ........................ 242/129.8; 242/84.2 B; 242/106; 242/134
[58] Field of Search .................... 242/106, 96, 84.5 A, 242/84.51 A, 128, 129.7, 129.8, 84.1 R, 130, 134, 84.2 B

[56] References Cited

U.S. PATENT DOCUMENTS

| | | | |
|---|---|---|---|
| 902,787 | 11/1908 | Wiebke | 242/106 X |
| 1,364,259 | 1/1921 | Eaton | 242/129.8 X |
| 1,795,043 | 3/1931 | Ross | 242/134 |
| 3,039,716 | 6/1962 | Visockis | 242/84.2 B |
| 3,215,361 | 11/1965 | Jones, Jr. | 242/106 X |
| 3,951,354 | 4/1976 | Bagby | 242/106 X |

*Primary Examiner*—Billy S. Taylor
*Attorney, Agent, or Firm*—John A. Hamilton

[57] ABSTRACT

A line winding device for fishing reels consisting of a holder for a spool of bulk line mountable on any rigid support, line being extendable from the spool for winding on the reel of a fishing rod, the holder being adjustable to position the spool in various positions relative to the support and to the fishing rod to provide twist-free and kink-free winding of the line on the reel, regardless of the type of reel being used.

1 Claim, 8 Drawing Figures

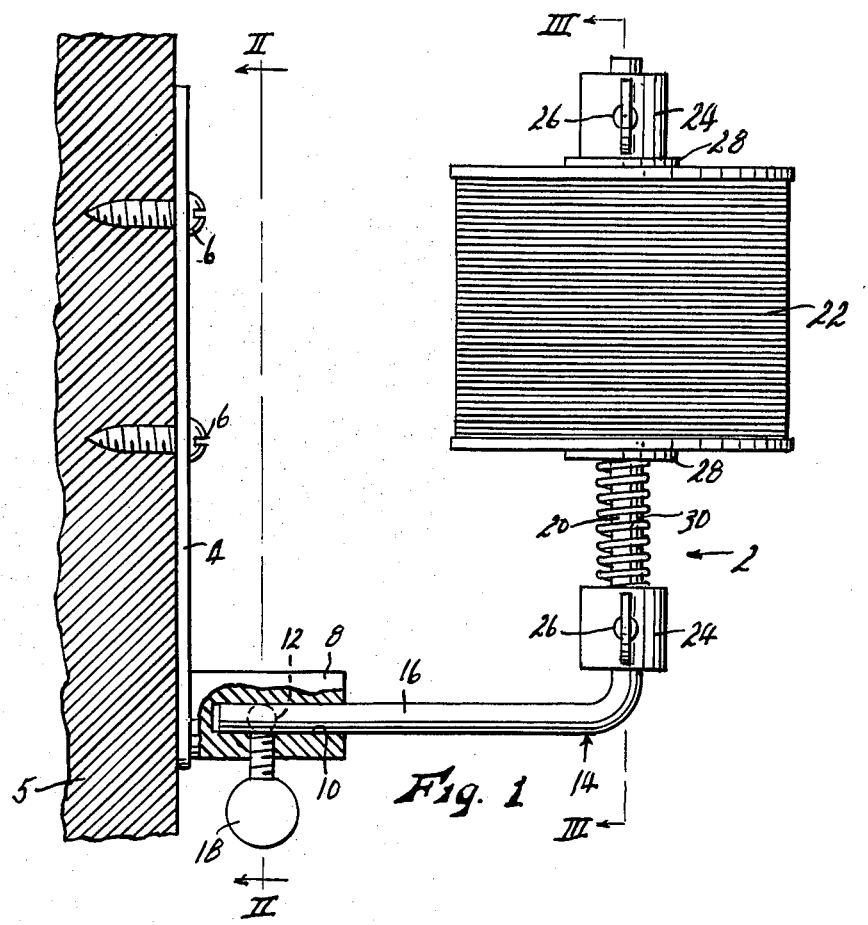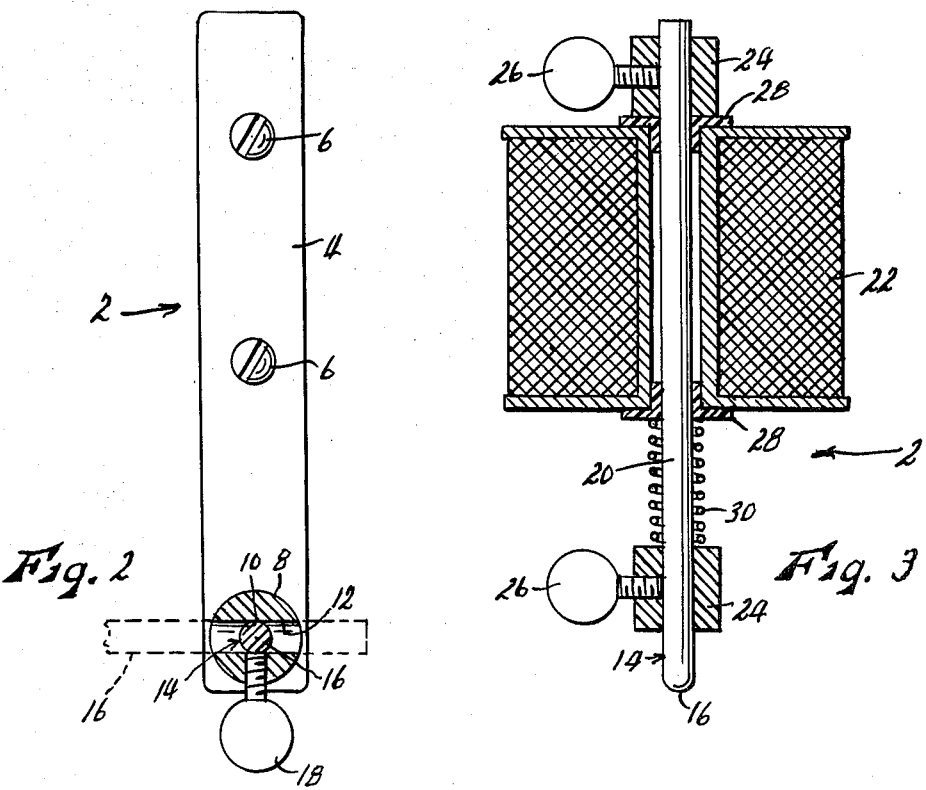

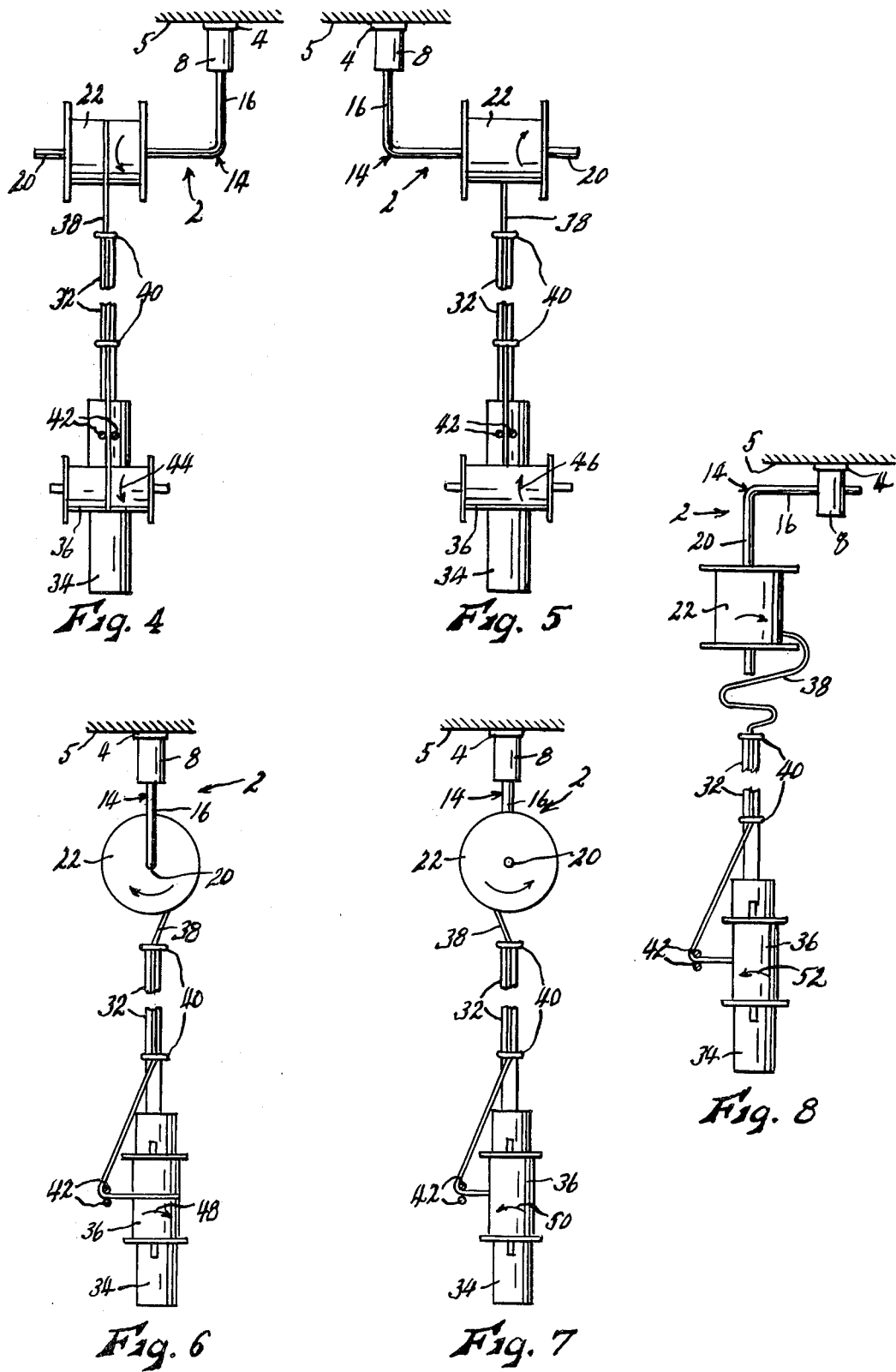

LINE WINDING DEVICE FOR FISHING REELS

This invention relates to new and useful improvements in devices for assisting in the winding of fishing line from the bulk spools on which such line is usually purchased to the reels of fishing rods, with the overall object of preventing twisting or kinking of said line, said twisting or kinking of the line most often occurring when the line is of the monofilament plastic type, which is the type of line in perhaps the most common usage at the present time.

Monofilament plastic fishing line tends to assume a permanent "set", or curvature, during the time it is stored on the bulk spools on which it is stored and sold prior to actual use, and if it is wound onto the fishing rod reel in any plane different from that in which it was unwound from the bulk spool, a twisting of the line occurs, and the permanent set of the line causes the line to "kink" as it winds onto the reel, with the result that the line tends to wind loosely and unevenly on the reel, so that it does not pay out evenly and smoothly when casts are subsequently made. This twisting and kinking occurs even when the line is wound onto the reel under tension, although the tension is an aid in at least partially alleviating it, or at least in providing a smooth, tight winding on the reel despite the twisting. The twisting and kinking also occur if the reel turns in a direction contrary to the permanent set of the line, so that the set "fights", or must be reversed by, the reels as the line winds thereon. Therefore, in summary, to prevent such twisting and kinking, it will be apparent that during the transfer of line from the spool to the reel, the reel must turn in a direction opposite to the turning of the spool, having reference to the direction in which the spool turns to pay out line, and the direction the reel turns to wind line thereon, and that any twist introduced into the line between the spool and the reel must be cancelled before the line approaches the reel. The provision of a spool holder by means of which these conditions can be met is the primary object of the present invention.

Bearing in mind that the spool holder is adapted to be used to wind line on the reel of a rod held in a normal position by a user, that some reels are arranged with their axes parallel to the rod, and other reels are arranged at right angles to the rod, and that in both cases the reel may turn in either direction to reel in line, and that in the first case, but not the second, the relative positions of the spool and reel tend to introduce a twist into the line, the problem becomes apparent. Generally, this problem is solved in the present device by rendering the spool holder readily adjustable, so that said spool may be positioned alternatively in either of two horizontally reversed position, so that the line pays out selectively from either the top or bottom sides thereof, or alternatively in either of two vertically reversed positions, so that the line pays out selectively from either the left or right side thereof.

Another object is the provision of a device of the character described including means for applying adjustable degrees of tension to the line intermediate the spool and reel.

Other objects are extreme simplicity and economy of construction, and efficiency and dependability of operation. With these objects in view as well as other objects which will appear in the course of the specification, reference will be had to the accompanying drawing wherein:

FIG. 1 is a side elevational view of a line winding device for fishing reels embodying the present invention, FIG. 2 is a sectional view taken on line II—II of FIG. 1, showing an alternative position of the spool mounting bar dotted lines, FIG. 3 is a sectional view taken on line III—III of FIG. 1, FIG. 4 is a schematic top plan view of the device, shown in operative relation to a fishing rod having an open-front reel with rearward recovery of line, FIG. 5 is a view similar to FIG. 4, but showing the arrangement for use with an open-front reel having a forward line recovery, FIG. 6 is a view similar to FIG. 4, but showing the arrangement for use with a closed-front or spinner reel with right-hand line recovery, FIG. 7 is a view similar to FIG. 4 but showing the arrangement for use with a closed-front or spinner reel with left-hand line recovery, and FIG. 8 is a view similar to FIG. 4 but showing an alternative arrangement for use with closed-front or spinner reels. Like reference numerals apply to similar parts throughout the several views, and the numeral 2 applies generally to a line winding device as contemplated by the present invention, best shown in its entirety in FIGS. 1–3. It includes a base plate 4 adapted to be secured to a wall, post, or any other suitable rigid support 5 by screws 6, the support preferably being disposed vertically. Welded or otherwise affixed to said base plate is a cylindrical stud 8 which projects outwardly and horizontally from said plate. Said stud has a horizontal axial bore 10 formed therein and opening outwardly, and a horizontal transverse bore 12 formed therethrough and intersecting bore 10. A right-angled spool mounting bar 14 is carried by said stud, having one leg 16 insertable either into bore 10, or alternatively through bore 12 as shown in dotted lines in FIG. 2, in either case being fixable therein by a set screw 18 threaded in said stud, and a leg 20 disposed at right angles to leg 16.

A spool 22 of bulk fishing line may be mounted rotatably and axially on bar leg 20, between a pair of collars 24 adjustably fixed on said bar leg by set screws 26. A pair of plastic friction bearing sleeves 28 are fitted into the respectively opposite ends of the hub of spool 22, and are rotatable on the bar leg 20. A helical compression spring 30 encircling the bar leg bears at one end against one of sleeves 28 and at its opposite end against the corresponding collar 24, while the other sleeve bears frictionally against the other collar. Thus, line can be drawn from the spool only under a degree of tension resulting from the resistance to rotation of the spool offered by the frictional contact sleeves 28 with the ends of the spool. This resistance, and hence the tension of the line as it is drawn from the spool, can be adjusted by moving collars 24 along bar leg 20 to vary the tension of spring 30.

FIGS. 4–8 show the positioning of the device as thus described for use with various types of fishing rod reels. By loosening set screw 18, bar leg 16 may be turned in stud 8 to cause bar leg 20 to extend upwardly, downwardly, or to either side from bar leg 16. In each of FIGS. 4–8, a foreshortened fishing rod is indicated at 32, having a handle indicated at 34. The rod carries a reel 36, on or adjacent handle 34 thereof. Although the showing is schematic only, it will be understood that the reel is axially rotatable in suitable bearings, and is turned manually, usually by a crank operating through suitable gearing to provide a faster rotation of the reel. With a spool 22 of bulk line mounted rotatably on leg 20 of bar 14 as already described, line 38 is extended from said spool, threaded through eyelets 40 of the fishing rod, and tied onto reel 36, after which line may be transferred from the spool to the reel by turning the reel in the usual manner. It will also be understood that nearly all reels are provided with guide pins 42, bales, or other line guiding means, which guide the line onto the reel and are mechanically driven by the reel mechanism to oscillate back and forth along the axial length of the reel as the line is reeled in, to insure even distribution of the windings along the length of the reel. Also, when it is desired to cast, the users operates a control, usually a thumb lever, which declutches the reel from its drive and disengages guide pins 42 from the line, in order that the line may pay out freely. However, details of the reel mechanism are not pertinent to the present invention, and are not shown. Reels of different types are disposed with their axes in different attitudes relative to the rod axis, either at right angles to the rod as in FIGS. 4 and 5 in so-called "open front" reels, and parallel to the rod as in FIGS. 6, 7 and 8 in "closed front" or spinner reels. In either case, the reel may turn in either direction, depending usually on its drive gearing. For example, in FIG. 4 the top of the reel 36 moves rearwardly as indicated by arrow 44, and provides what may be termed a "rear line recovery". In FIG. 5, the top reel 36 moves forwardly as indicated by arrow 46, and provides what may be termed a "front line recovery". In FIGS. 6 and 7, the tops of the reels move respectively to the right and to the left as indicated by arrows 48 and 50, providing "right recovery" and "left recovery" respectively. FIG. 8 also shoes a left recovery reel, as indicated by arrow 52, but is a special case which will be discussed later.

For the rear recovery open-front reel of FIG. 4, the line winds thereon over its top, and properly positioning spool bar 14 in stud 8, spool 22 is positioned so that its axis is generally parallel to the reel axis, and the line pays out from the top thereof as shown. With the spool oriented as shown, this means that bar leg 20 must extend to the left. Thus the line proceeds from the spool to the reel without twist, and winds onto the reel in a direction opposite to that in which it unwound from the spool, so that any permanent "set" thereof accomodates readily to the curvature of the reel, and does not fight it to cause kinking of the line. Thus the line winds onto the reel very smoothly and neatly, without twist or kinking. The line tension introduced by sleeves 28 and spring 30 insures that the windings on the reel will be snug and compact. On the other hand, in the front recovery open-front reel of FIG. 5, the line enters the bottom side of reel 36, and hence the line must proceed from the bottom side of spool 22 in order that the line set will conform to the curvature of the reel. This reversal of spool 22 is provided very quickly and easily by turning leg 16 of bar 14 in stud 8 so that bar leg 20 projects to the right, as shown. In neither case do guide pins 42 introduce any appreciable twist into the line, since the change of line direction caused thereby is so slight.

For the closed-front or spinner reels shown in FIGS. 6 and 7, spool 22 is positioned with its axis generally vertical, so that lines pays out from the right side of the spool if the reel has right line recovery as in FIG. 6, or from the left side of the spool if the reel has left line recovery as in FIG. 7, such a reversal being easily and quickly obtained by turning bar 14 in stud 8 to cause leg 20 thereof to project either downwardly or upwardly, as may be required. Line tension is still supplied by sleeves 28 and spring 30. The advantages of disposing spool 22 vertically whenever the reel axis is parallel to the rod, instead of horizontally when the reel is at right angles to the rod as in FIGS. 4 and 5, while clearly observable in practice as providing twist and kink-free winding of the line on the reel, are not clearly apparent in view of the complexities of analyzing the actual angular position of the line, in repect to any permanent set it may have assumed, at any particular point in its travel. However, it is believed to be due to the fact that guide pins 42, or other guide means, must change the direction of line travel by about 90 degrees for reels of these types, and that in so doing they introduce about a quarter-twist into the line, the direction of this twist depending on the direction the reel is turning. Apparently, the positioning of the spool vertically, or at right angles to the general horizontal plane of the reel, introduces an opposite quarter-twist into the line which effectually cancels that introduced by the guide pins.

It will be apparent that in either of the horizontal spool positions shown in FIGS. 4 and 5, or in either of the vertical spool positions shown in FIGS. 6 and 7, reversals of the directions of spool rotation could be obtained by removing the spool from bar 14, turning it end-for-end, and remounting it on the bar, rather than by turning said bar in stud 8 as heretofore described. This type of reversal may be useful in some cases, and the easy removability of collars 24 makes it practical. However, the movability of bar 14 as described is considered to be a substantial improvement, since it permits a large bulk line spool to be mounted thereon only once, and used to line reels of any assorted types until it is exhausted, with no necessity of remounting it for different types of reels. In other words, it provides for either vertical or horizontal positioning of the spool, and for reversal of rotation in either position.

In FIG. 8, leg 16 of bar 14 has been removed from bore 10 of stud 8 and reinserted in bore 12, as indicated in dotted lines in FIG. 2, with bar leg 20 projecting outwardly from support 5 to be generally coaxial with a normally held fishing rod 32, and carrying spool 22 thereon. Thus the line 38 uncoils from the outer end of the spool, as indicated, but the spool does not turn. It makes little difference what type of reel is used in this attitude of the spool. This usage is not recommended, and is provided only for use by fishermen who are familiar with it, or prefer it for any reason. It is not recommended because, since the line pays out axially of the spool and the spool does not turn, it introduces substantial twist into the line, one full twist for each convolution of the line paid out, and also because since the spool does not turn, sleeves 28 and spring 30 are ineffective to apply tension to the line. Under these circumstances, it is extremely difficult to wind the line smoothly, tightly and compactly onto the reel, and it can be accomplished even to a reasonable degree only by applying a heavy manual tension to the line before it enters on the reel. This tension is usually applied by the fisherman using his thumb to press the line tightly against the reel case or other structural element, applying a substantial frictional resistance to passage of said line.

While I have shoen and described a specific embodiment of my invention, it will be readily apparent that many minor changes of structure and operation could be made without departing from the spirit of the invention.

What I claim as new and desire to protect by Letters Patent is:

1. A line winding device for fishing reels comprising:
   a. a base member adapted to be affixed to a generally vertical support,
   b. a spool bar adapted for the mounting thereon of a spool of bulk fishing line for axial rotation relative to said support, from which spool said line may be paid out to a fishing rod and reel combination, said spool bar constituting an angled bar having right-angled first and second legs,
   c. connecting means joining said spool bar to said base and comprising a stud affixed to said base member and having an outwardly opening first bore formed therein for receiving the free end portion of the first of said bar legs slidably and rotatably therein, said spool being mountable for axial rotation on the second leg of said bar, said first leg extending generally horizontally outwardly from said support, whereby by turning said first leg in said stud said spool may be positioned selectively in either of two relatively reversed horizontal positions, or in either of two relatively reversed vertical positions, all of said horizontal and vertical positions lying in a generally vertical plane, said stud being provided with a second bore disposed horizontally and at right angles to said first bore, the first leg of said spool bar being insertable alternatively in said second bore, whereby the spool carried by said second bar leg is so disposed that line is paid out over the end of said spool in a direction parallel to its axis, and
   d. means operable to fix said first bar leg in said stud at any desired angular position in the rotation thereof.

* * * * *